Patented Aug. 19, 1924.

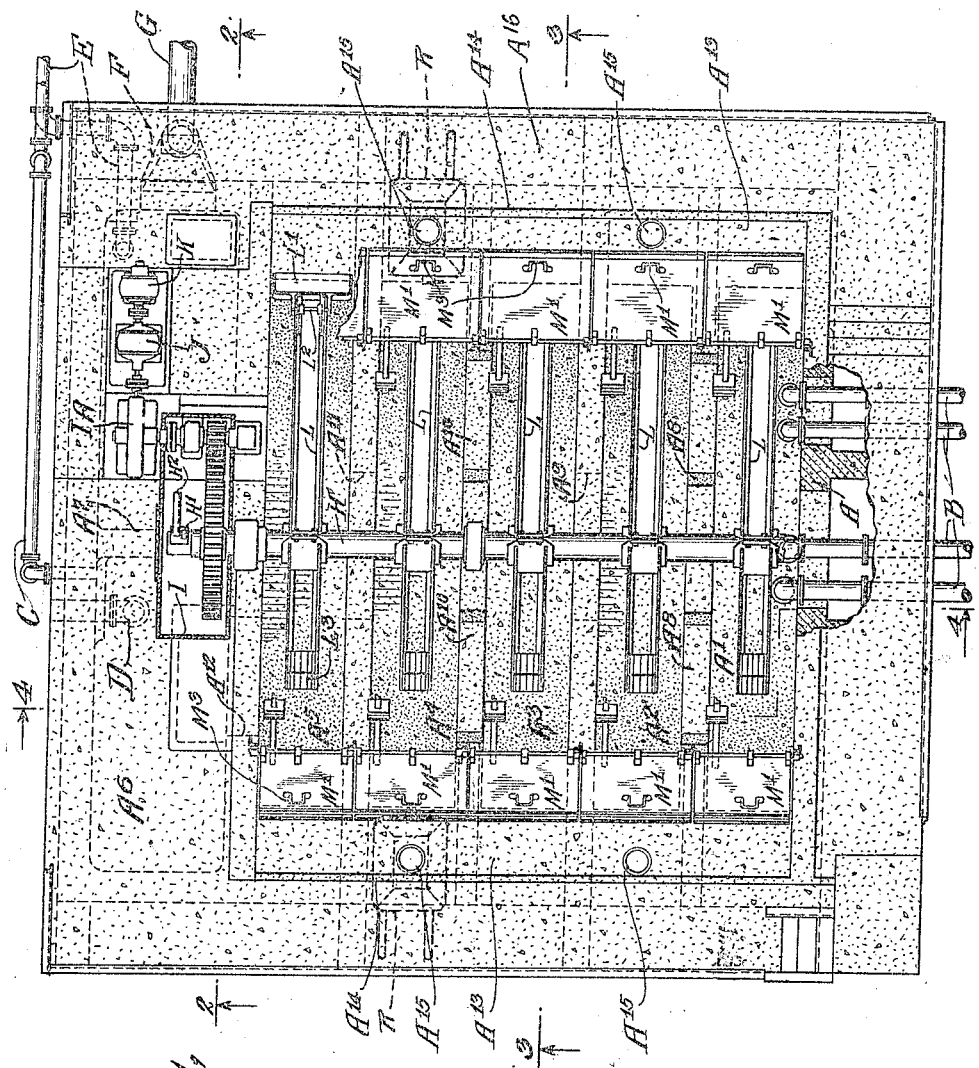

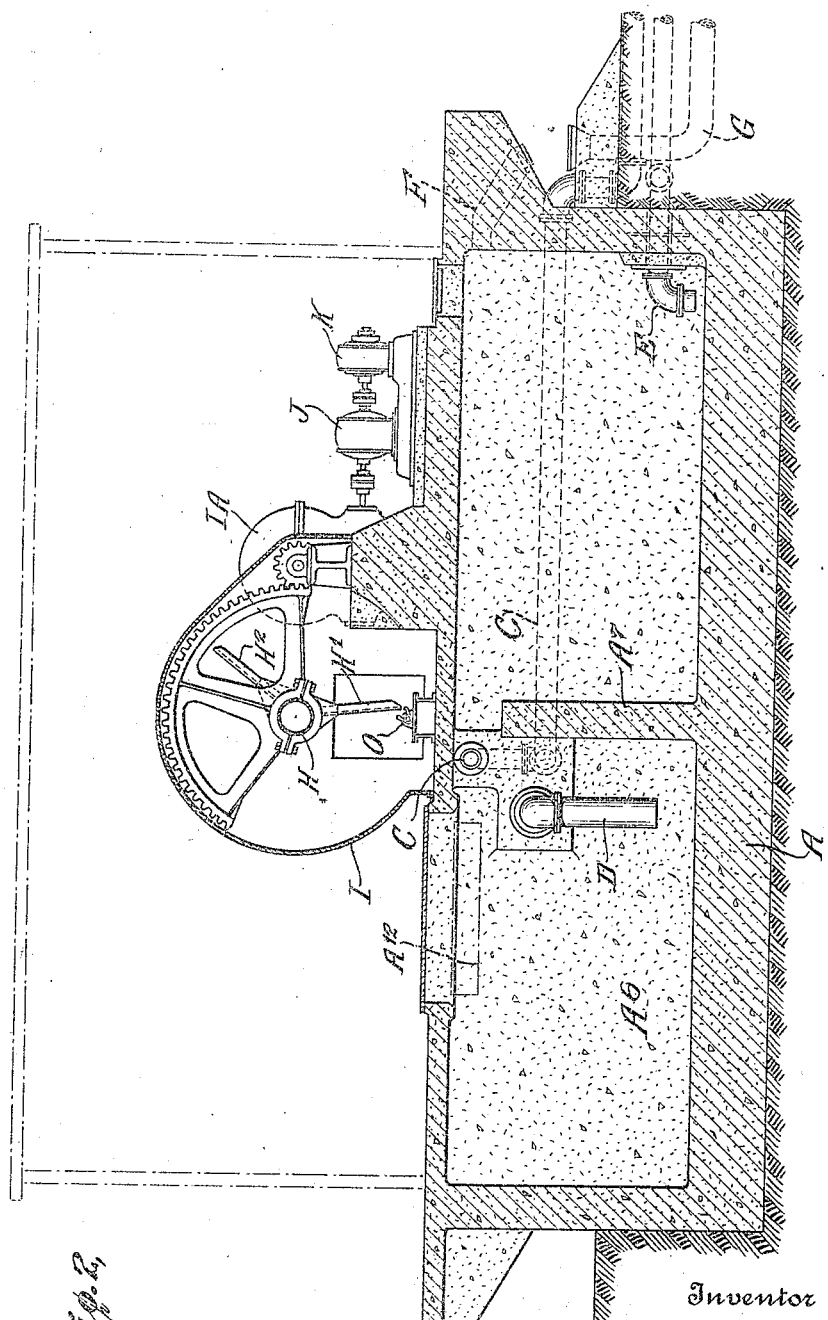

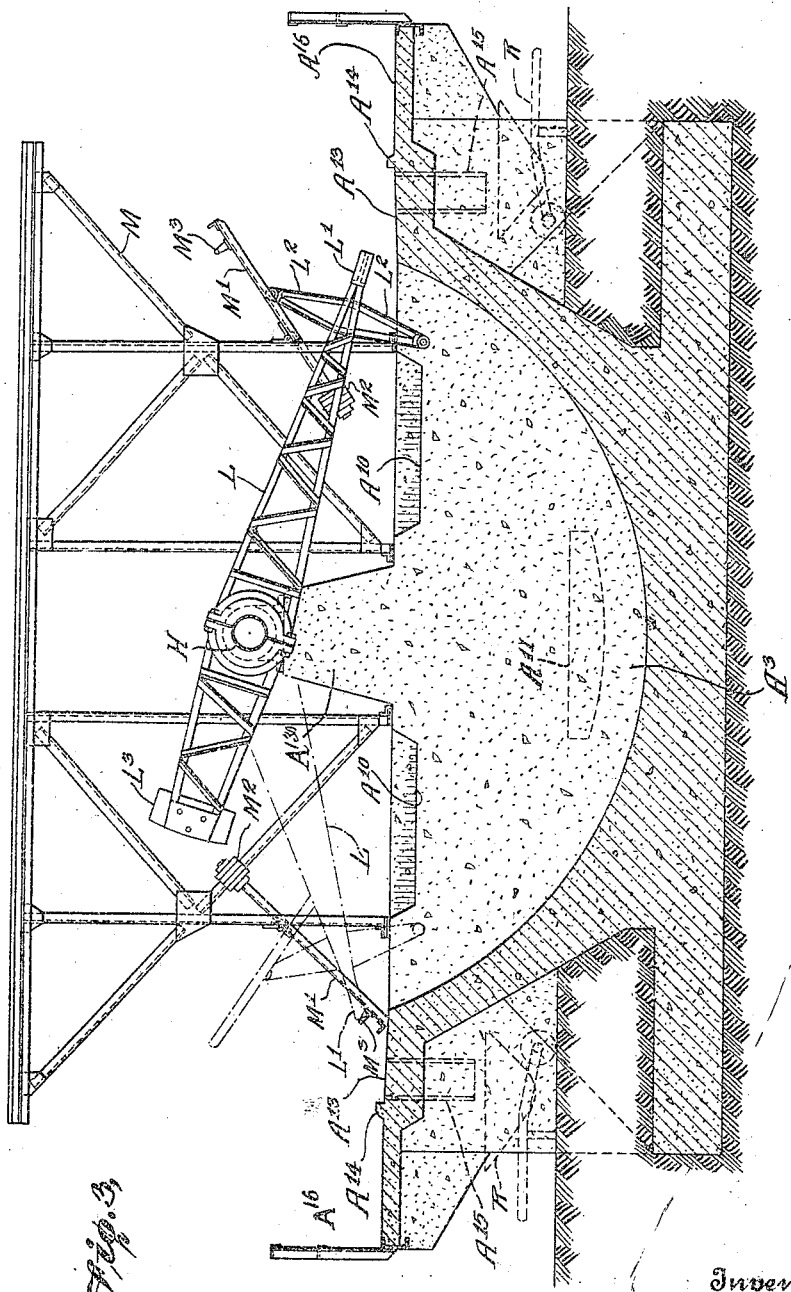

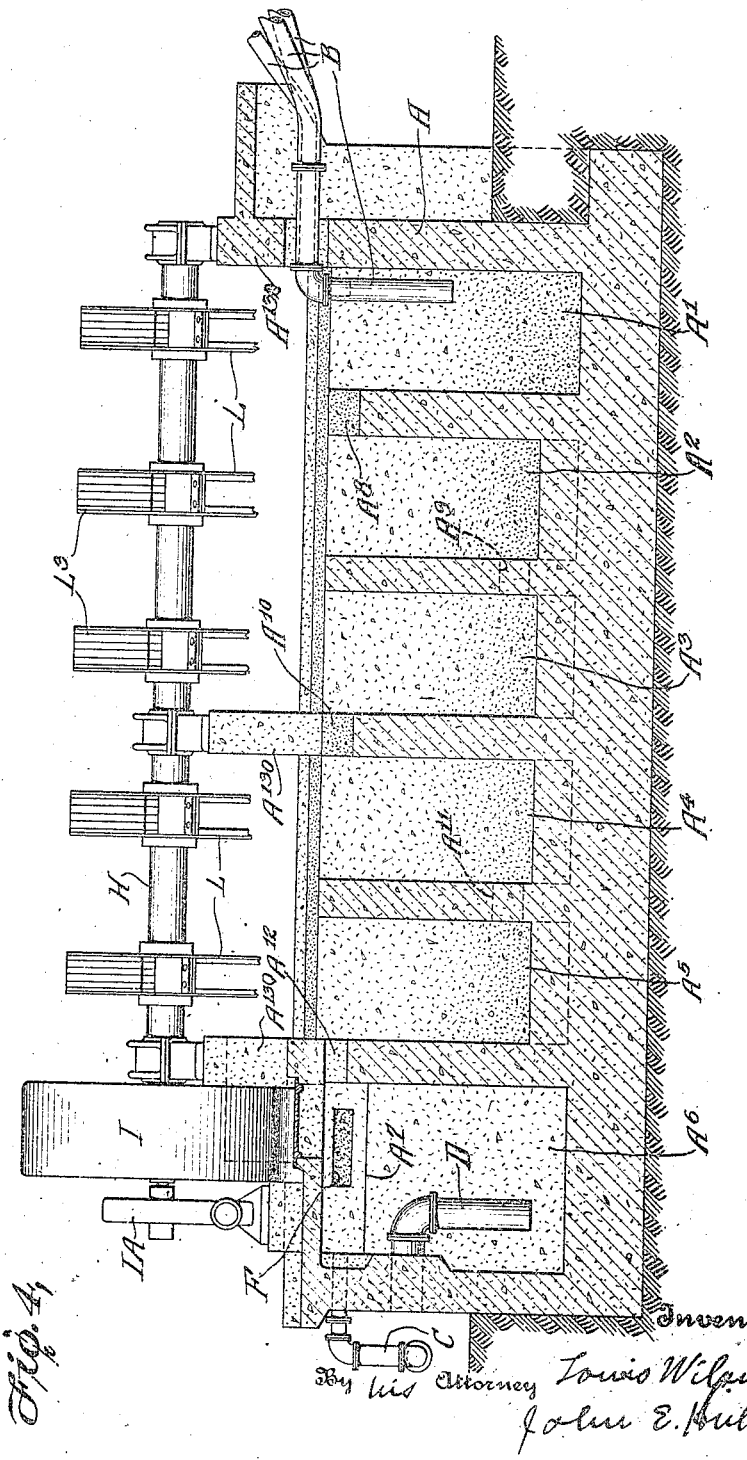

1,505,759

UNITED STATES PATENT OFFICE.

LOUIS WILPUTTE, OF NEW ROCHELLE, NEW YORK, ASSIGNOR OF TWO-THIRDS TO ALICE A. WILPUTTE, OF NEW ROCHELLE, NEW YORK.

APPARATUS FOR AND METHOD OF DECANTATION.

Application filed October 24, 1918. Serial No. 259,492.

*To all whom it may concern:*

Be it known that I, LOUIS WILPUTTE, a citizen of the United States, and a resident of New Rochelle, in the county of Westchester and State of New York, have invented certain new and useful Improvements in Apparatus for and Methods of Decantation, of which the following is a specification.

My present invention relates to the decantation of liquids of such character that provisions are required for periodically removing deposits settling out of the material passed into the decanting chamber and depositing on the walls thereof. The invention was primarily devised for use in a by-product coke oven plant. In such a plant, tar is collected from various portions of the plant, and some of the tar thus recovered contains pitch and foreign matter which are removed in whole or in part, by passing the tar through a settling or decanting chamber or tank. The pitch and foreign matter thus removed from the tar in a settling or decanting tank adheres to the walls of the latter with considerable tenacity and unless removed from time to time soon clogs up the settling tank.

The object of the present invention is to provide a novel method of and apparatus for decantation suitable for use in purifying tar, which will be simple, reliable and effective, and will permit of efficient cleaning of the settling chamber employed as frequently as may be necessary without interfering with the continuous use of the chamber as a decanting instrument.

The various features of novelty characterizing my invention are pointed out with particularity in the claims annexed to and forming a part of this specification. For a better understanding of the invention, however, and the advantages possessed by it, reference should be had to the accompanying drawings and descriptive matter, in which I have illustrated and described a preferred embodiment of my invention.

Of the drawings:

Fig. 1 is a plan view with parts broken away and in section.

Fig. 2 is an elevation in section on line 2—2 of Fig. 1 with parts broken away and removed.

Fig. 3 is an elevation in section on the line 3—3 of Fig. 1.

Fig. 4 is an elevation in section on the broken line 4—4 of Fig. 1 with the housing removed.

In the drawings A represents a tank structure, especially designed for use in purifying the tar coming from the hydraulic mains and other tar collecting portions of a by-product coke oven plant. The tank structure, in the particular form shown, is made out of concrete, and is divided into a plurality of similar compartments, $A^1$, $A^2$, $A^3$, $A^4$ and $A^5$, having cylindrical bottom walls. Each of these compartments $A^1$ to $A^5$ inclusive is in effect a segment of a cylinder, the axis of which is coaxial with the shaft H, hereinafter referred to.

The tar to be purified passes into the compartment $A^1$ through the drain pipes B. The compartment $A^1$ is connected to the compartment $A^2$ by overflow orifices $A^8$, which may be notches in the upper edge of the wall separating the compartments $A^1$ and $A^2$. The compartments $A^2$ and $A^3$ are connected adjacent their lower ends by a port $A^9$ through the wall between the compartments. Overflow orifices or notches $A^{10}$ are formed in the upper edge of the wall between the compartments $A^3$ and $A^4$, and the compartments $A^4$ and $A^5$ are connected adjacent their lower edges by a port $A^{11}$ similar to the port $A^9$.

From the compartment $A^5$ the tar flows through an upper outlet port $A^{12}$ into a compartment $A^6$. The latter is divided in two halves by a bridge wall $A^7$ with separate suction pump outlets D and E from the two sections. C represents a tar makeup supply line through which purified tar may be returned from storage necessary to the compartment $A^6$ in order to insure a supply to the outlet, and F represents an emergency overflow outlet from the compartment $A^6$ discharging into a conduit G running to waste.

In the ordinary use of the apparatus disclosed the tar withdrawn through the outlet D is recirculated through the hydraulic main of the plant, while the tar withdrawn through the outlet E passes to storage.

H represents a shaft journalled in bearings mounted on pier extensions $A^{130}$ of the concrete tank structure. The shaft H is intermittently rotated first in one direction and then in the opposite direction by means of a motor K connected to the shaft H by speed reducing gearings mounted in housings I, I^A and J. The shaft H carries arms L, one for each of the compartments $A^1$ to $A^5$ inclusive, each arm L is provided at its free end with a scraper shoe $L^1$, which sweeps along the cylindrical wall of the corresponding tank compartment and has radial edge portions which sweep along the vertical walls of the tank compartment through a zone adjacent to the curved wall of the compartment. The arms L are extended at the opposite side of shaft H from the scraper shoes $L^1$ to support counter weights $L^3$. The tank compartments $A^1$ to $A^5$ inclusive, the shaft H, the parts carried by the latter are enclosed in a housing M comprising doors $M^1$ at each end of each of the compartments $A^1$ to $A^5$ inclusive. The doors M are normally closed as shown at the left hand side of Figs. 1 and 3 but may be manually opened when desirable, each door being provided with a handle $M^3$ for this purpose. These doors $M^1$ are advantageously partially counter-balanced by weights $M^2$. Each arm L is provided adjacent its scraper shoe $L^1$ with transverse projections $L^2$ which serve to lift the corresponding doors $M^1$ into their open positions as the scraper shaft H reaches the opposite limits of its to and fro movements. At the opposite ends of the tank compartments $A^1$ to $A^5$ ledges or platform sections $A^{13}$ are advantageously provided to receive the material swept out of the tank compartments by the scrapers $L^1$. A rib $A^{14}$ separates each platform section $A^{13}$ from a path or walk $A^{16}$ alongside the platform section. Pipes $A^{15}$ located at convenient points leading downward through the platforms $A^{13}$, are provided to carry away material deposited on the platforms $A^{13}$.

In operation the tar passes successively through the settling tank compartments $A^1$, $A^2$, $A^3$, $A^4$ and $A^5$ as hereinbefore explained. In thus passing through the different compartments the pitch and heavier foreign matter settle out in the various compartments. The matter thus settling out of the tar tends to adhere with considerable tenacity to the bottom walls of the tank compartments, and unless removed, as already explained, would soon fill up these compartments. This filling up of the tank compartments is prevented however with the apparatus described by the scrapers $L^1$ which are caused to sweep slowly back and forth along the curved bottom walls of the compartments between the full and dotted line positions of the scrapers shown in Fig. 3. In practice a sufficient speed reduction is obtained by the gear connections between the motor K and the shaft H, so that a half hour or so is required for the movement of the scrapers between the two positions shown in Fig. 3. This slow movement prevents agitation of the tar in the tank compartments which would interfere with the continuous settling out of pitch and impurities from the tar. When the scrapers are in either of the two positions shown in Fig. 3 a workman standing on the walk $A^{16}$ may readily remove with a shovel or hoe, the pitch and impurities resting on the then uppermost side of the scrapers $L^1$. The material thus removed from the scrapers may be first deposited on the adjacent platforms $A^{13}$ and then removed from the latter by working it down into the pipe $A^{15}$ through which it may fall into wheelbarrows or other removable receptacles R located under the platforms. While the scrapers are making their following movement through the tank compartments, the same workman who cleans the scrapers may wheel away or otherwise dispose of the material received in the receptacles R.

Provision may be made for automatically stopping the motor at the end of each tank cleaning movement of the shaft H as by means of arms $H^1$ and $H^2$ carried by the shaft H and a motor controlling device O of known form actuated thereby.

While in accordance with the provisions of the statutes I have illustrated and described the best mode of carrying out my invention now known to me those skilled in the art will understand that changes may be made in the form of my invention without departing from the spirit of my invention as set forth in the appended claims, and that certain features of my invention may sometimes be used to advantage without a corresponding use of other features.

Having now described my invention, what I claim as new and desire to secure by Letters Patent, is:

1. The combination with a settling tank divided into a series of communicating compartments arranged side by side and having curved bottom walls, and an inlet connection opening to the tank at one end and an outlet connection from the tank at the opposite end of the series of compartments, of a shaft journaled above the tank and cleaning devices carried by the shaft, one for each of said compartments and each caused to sweep along the bottom wall of the corresponding compartment by the rotation of said shaft.

2. Apparatus for removing pitch and foreign matter from the tar recovered from the vaporized products of a by-product coke oven comprising in combination a tank structure having a settling chamber formed with a curved bottom wall and with a platform at one end of said curved wall and a cleaning device pivoted to sweep along the bottom wall of the tank and to carry material swept off the wall to said platform.

3. Decanting apparatus comprising in combination a tank structure formed with a curved bottom wall and and with a platform at one end of the said curved wall, of a cleaning device pivoted to sweep along said curved wall and carry material swept off the wall to said platform, the latter being formed with a port, and a receptacle located below the platform and adapted to receive material passed downward through said port.

4. The combination with a settling tank having a curved bottom wall, of a cleaning device pivoted above the tank and adapted to sweep along said bottom wall, and a housing covering said tank and cleaning device and comprising a door at one end of said curved wall adapted to be engaged and opened by the cleaning device as the latter is moved into proximity with said tank bottom wall end.

5. The improvement in the method of removing by decantation pitch and foreign matter from the tar recovered from the vaporized products of a by-product coking oven, which consists in maintaining a gentle flow of the tar through a settling tank and moving a scraper slowly along the bottom wall of the tank to thereby remove material deposited on said wall without agitating the tank contents so as to interfere with continuous decantation.

6. Apparatus for removing pitch and foreign matter from the tar recovered from the vaporized products of a by-product coke oven comprising in combination a settling tank having inlet and outlet provisions limiting the normal liquid level therein, and a concave bottom wall one edge of which extends above the normal liquid level, of mechanical bottom cleaning means comprising a cleaning member and means for moving it along said bottom wall up to said edge.

Signed at New York city in the county of New York and State of New York this 18th day of October, A. D. 1918.

LOUIS WILPUTTE.